Patented Feb. 28, 1928.

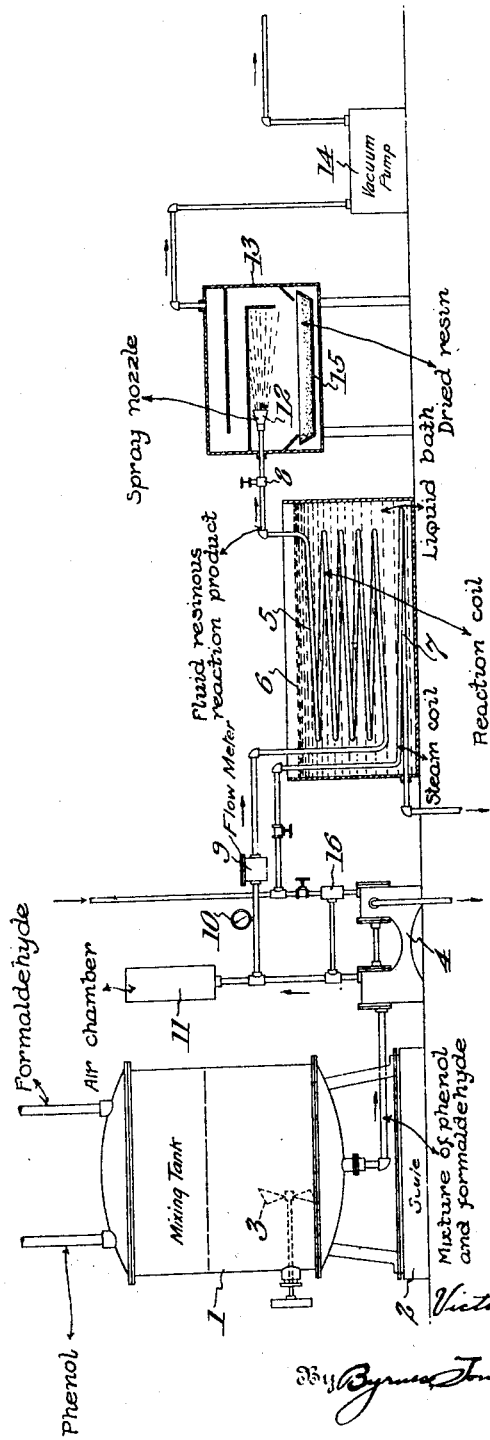

1,660,403

UNITED STATES PATENT OFFICE.

VICTOR H. TURKINGTON, OF EVANSTON, ILLINOIS, ASSIGNOR TO BAKELITE CORPORATION, OF NEW YORK, N. Y., A CORPORATION OF DELAWARE.

PROCESS FOR THE CONTINUOUS PREPARATION OF PHENOLIC RESINS.

Application filed February 20, 1924. Serial No. 694,143.

This invention relates to the manufacture of phenolic resins, and comprises a process whereby phenolic resins, which may be either of the permanently fusible or non-reactive type or of the potentially reactive type, may be prepared in a continuous manner. As is well understood in this art, the permanently fusible resins may be transformed into potentially reactive resins by appropriate additions of so-called hardening reagents, such as formaldehyde, hexamethylenetetramine, higher aldehydes or the like. The permanently fusible resins may be kept indefinitely in molten state without change, but the potentially reactive resins, although initially fusible, undergo gradual transformation, at a sufficient temperature, into the known infusible phenolic condensation products, or so-called "resinoids."

Heretofore these resins have always been prepared according to the batch system. According to the present invention, I provide a continuous system for their manufacture under closely controlled conditions.

I will describe the invention by reference to a specific preferred embodiment thereof, but it will be understood that the invention is not restricted to the particular type of apparatus, or to the particular manipulations, set forth by way of illustration and example.

For a full understanding of the invention reference is made to the accompanying drawing, wherein the figure is a representation, diagrammatic in character, of a form of installation for the continuous preparation of the resin in powder form:

Referring to said drawing, 1 indicates a mixing tank mounted on a scale 2 and provided with a mixing agitator 3. The phenol and aqueous formaldehyde, or their equivalents, are charged into this tank and thoroughly mixed, the catalyst, if such is used, being also added at this point. The reaction mixture is fed to a pump 4, preferably a steam piston pump capable of producing a pressure of the order of 100–500 pounds per square inch. The pressure is maintained constant at the desired value by means of an adjustable pressure regulator installed in a by-pass connecting the steam supply line to the pump discharge line. From the pump the reaction mixture passes through the reaction coil 5, formed of extra heavy iron or copper tubing immersed in a bath 6 of oil or other suitable liquid of high boiling point. 7 represents a closed steam coil, supplied with steam at about 125 pounds pressure, and used for heating the oil bath 6 to initiate the reaction. This coil may also be supplied with water connections for cooling the bath, should this be required. This reaction is strongly exothermic, and the heat of reaction will ordinarily suffice to maintain the proper temperature of the oil bath, provided the operation is carried out on a sufficient scale.

The reaction mixture is forced slowly through the coil 5, the rate of flow being controlled by a needle valve 8 and measured by a recording flow-meter 9. 10 represents a pressure gauge, and 11 an air chamber on the discharge line of pump 4. The regulation of the flow, and of the temperature of the bath 6, is such that the reaction is completed to the desired point when the reaction mixture reaches the discharge end of the coil 5. It will be apparent that the maximum rate of flow will depend largely on the length of this coil.

The reaction mixture in the coil is now a fluid resinous mass containing a large proportion of water, in case aqueous formaldehyde was supplied to the mixing tank 1. This mixture is sprayed by a spray-nozzle 12, into a vacuum chamber 13, in which a relatively high vacuum is maintained by a vacuum pump 14. The resin is collected in a pan 15 from which it may be withdrawn continuously or from time to time. In practice two vacuum chambers are provided, used alternately, thereby avoiding interruption of the operation.

When the highly heated and fully reacted mixture is sprayed into the vacuum chamber the water is instantly removed as vapor, and the resin is at the same time cooled to 50° C. or less, which is below the temperature at which the reaction proceeds at an appreciable rate. If desired the vacuum chamber may be water-jacketed to promote this cooling. Thereby two important results are achieved, to wit, the water is quickly removed; and the reaction is checked almost instantly and at exactly the right point. In this way a most efficacious control of the entire process is secured.

In case the resin is of the permanently fusible or non-reactive type (such as results for example when 100 parts of phenol are reacted with 70 parts or less of 40% formaldehyde without a catalyst or with an acid catalyst) the operation is very simple and special precautions are not required to prevent the reaction from proceeding too far. However, if the resin is of the reactive type (such as results for example when 90 to 100 parts of formaldehyde are used per 100 parts of phenol, especially with a basic catalyst) it is essential to maintain a very close control to avoid possibility of formation of an infusible resin. In such cases I prefer to start the system in operation using such phenol-formaldehyde ratio as will produce a permanently fusible resin, and to increase this ratio, and to provide the conditions for making the reactive resin, only after the conditions of temperature equilibrium and rate of flow have been fully established.

With regard to the advantages of this type of operation, it may be pointed out that the present practice employs digesters or stills having a capacity of several thousand pounds. In such large masses very careful control of the reaction is required, and an accident to the cooling-water supply, for example, might entail the setting of the entire mass into an infusible resin, resulting not only in the loss of the materials but keeping the unit out of production for considerable periods. It is also difficult to effect such control of these large masses as will produce a strictly uniform finished product.

In the continuous operation only a small quantity of material is in process at a given time, and even in the event that the resin should reach the infusible condition in the coil, this latter may be quickly replaced. There is however little danger of this, since the reaction can be very accurately controlled, and all conditions of mix proportions, rate of flow, pressure, temperature, etc., can be definitely established and continuously maintained to produce in uniform quality the desired grade of finished product, whether of the reactive or non-reactive type. The continuous operation also effects some saving of steam and cooling water, due to the fact that little of either is required after the process is once in operation, owing to the fact that the heat of reaction is transferred to the oil bath 6 and thereby utilized to preheat the mixture to the reacting temperature. Furthermore a large production can be obtained from a single unit with a minimum of labor and supervision.

I have referred to phenol and formaldehyde as the reagents, but it will be understood that the invention is applicable broadly to phenolic resins of every type, irrespective of the particular phenol or phenolic body employed, or of the nature of the aldehyde or methylene-containing reagent used therewith. Materials other than high-boiling oils may of course be used for the bath 6, and any appropriate means may be provided for heating or cooling this bath. For example, a thermostatic temperature control may be applied at this point.

I claim:—

1. Process of preparing phenolic resins, comprising commingling a phenolic body in liquid phase and a hardening reagent in reacting proportions to give a liquid resinous body, passing the mixture in continuous flow through a heated zone, and utilizing the heat of the reaction to maintain the heat of the reaction zone.

2. Process of preparing phenolic resins, comprising commingling a phenolic body in liquid phase and a hardening reagent in reacting proportions to give a liquid resinous body, passing the mixture under pressure and in continuous flow through a heated zone, and utilizing the heat of the reaction to maintain the heat of the reaction zone.

3. Process of preparing phenolic resins, comprising commingling a phenolic body and a hardening reagent in reacting proportions to give a liquid resinous body, passing the mixture under pressure and in continuous flow through a heated zone, and suddenly releasing the pressure to cool the product and check the reaction.

4. Process of preparing phenolic resins, comprising commingling a phenolic body and a hardening reagent in reacting proportions to give a liquid resinous body, passing the mixture under pressure and in continuous flow through a heated zone, and spraying the product into a vacuum chamber to check the reaction.

5. Process of preparing phenolic resins, comprising commingling a phenolic body and a hardening agent in reacting proportions to give a liquid resinous body in presence of water, passing the mixture in continuous flow through a heated zone, and spraying the product into a vacuum chamber, thereby checking the reaction and dehydrating the resin.

6. In a process of preparing phenolic resins, the step comprising spraying the hot liquid resin into a vacuum chamber to cool the same and to check the reaction.

7. Process of preparing phenolic resins, comprising commingling a phenolic body in liquid phase and a hardening agent in proportion to yield a liquid resinous reaction product, and passing the mixture in continuous flow through a heated reaction zone.

8. Process of preparing phenolic resins, comprising commingling a phenolic body in liquid phase and formaldehyde in proportion to yield a liquid resinous reaction product, and passing the mixture in continuous flow through a heated reaction zone.

In testimony whereof, I affix my signature.

VICTOR H. TURKINGTON.